(12) United States Patent
Lenke et al.

(10) Patent No.: US 12,269,491 B2
(45) Date of Patent: Apr. 8, 2025

(54) METHODS AND SYSTEMS FOR INCREASING AUTONOMOUS VEHICLE SAFETY AND FLEXIBILITY USING VOICE INTERACTION

(71) Applicant: Cerence Operating Company, Burlington, MA (US)

(72) Inventors: Nils Lenke, Aachen (DE); Johan Wouters, Cham (CH); Adam Emfield, Concord, MA (US); Sumanta Chakraborty, San Ramon, CA (US); Charles L. Ortiz, Jr., Fremont, CA (US)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 18/108,709

(22) Filed: Feb. 13, 2023

(65) Prior Publication Data

US 2023/0227053 A1 Jul. 20, 2023

Related U.S. Application Data

(63) Continuation of application No. 16/734,108, filed on Jan. 3, 2020, now Pat. No. 11,577,742.

(Continued)

(51) Int. Cl.
*B60W 50/08* (2020.01)
*B60W 30/18* (2012.01)
(Continued)

(52) U.S. Cl.
CPC ............ *B60W 50/08* (2013.01); *B60W 30/18* (2013.01); *G05D 1/0088* (2013.01); *G10L 15/22* (2013.01);
(Continued)

(58) Field of Classification Search
CPC ................ B60W 50/08; B60W 30/18; B60W 2050/007; B60W 2050/0074;
(Continued)

(56) References Cited

U.S. PATENT DOCUMENTS 5,274,560 A    12/1993   LaRue
9,971,348 B1 *   5/2018   Canavor ............ G01C 21/3461
(Continued)

FOREIGN PATENT DOCUMENTS

CA        3026666 A1    12/2018
CN     106379310 A     2/2017
(Continued)

OTHER PUBLICATIONS

Machine Translation of EP 1083543 B1 (Schaaf et al., hence Schaaf) from IP.com.Mar. 14, 2024 (Year: 2024).*
(Continued)

*Primary Examiner* — Michael V Kerrigan
*Assistant Examiner* — Tanya C Sienko
(74) *Attorney, Agent, or Firm* — Occhiuti & Rohlicek LLP

(57) ABSTRACT

A vehicle control system executing a voice control system for facilitating voice-based dialog with a driver to enable the driver or autonomous vehicle to control certain operational aspects of an autonomous vehicle is provided. Using environmental and sensor input, the vehicle control system can select optimal routes for operating the vehicle in an autonomous mode or choose a preferred operational mode. Occupants of the autonomous vehicle can change a destination, route or driving mode by engaging with the vehicle control system in a dialog enabled by the voice control system.

21 Claims, 6 Drawing Sheets

Related U.S. Application Data

(60) Provisional application No. 62/788,471, filed on Jan. 4, 2019.

(51) Int. Cl.
*B60W 50/00* (2006.01)
*G05D 1/00* (2024.01)
*G10L 15/22* (2006.01)

(52) U.S. Cl.
CPC ............... *B60W 2050/007* (2013.01); *B60W 2050/0074* (2013.01); *B60W 2420/403* (2013.01); *B60W 2540/043* (2020.02); *B60W 2540/21* (2020.02); *G10L 2015/223* (2013.01)

(58) Field of Classification Search
CPC ..... B60W 2420/403; B60W 2540/043; B60W 2540/21; G05D 1/0088; G10L 15/22; G10L 2015/223
See application file for complete search history.

(56) References Cited

U.S. PATENT DOCUMENTS

| | | | |
|---|---|---|---|
| 10,337,874 B2 * | 7/2019 | Nagy | G01C 21/3484 |
| 10,451,428 B2 | 10/2019 | Lathrop et al. | |
| 2009/0010488 A1 * | 1/2009 | Matsuoka | B60W 40/08 382/100 |
| 2012/0316699 A1 | 12/2012 | Filev et al. | |
| 2014/0303827 A1 | 10/2014 | Dolgov et al. | |
| 2015/0314780 A1 | 11/2015 | Stenneth et al. | |
| 2017/0068245 A1 | 3/2017 | Scofield et al. | |
| 2017/0088145 A1 | 3/2017 | Gordon et al. | |
| 2017/0102700 A1 * | 4/2017 | Kozak | B60W 30/00 |
| 2017/0110022 A1 | 4/2017 | Gulash | |
| 2017/0259832 A1 | 9/2017 | Lathrop et al. | |
| 2017/0263252 A1 | 9/2017 | Abdelsamie et al. | |
| 2017/0287476 A1 | 10/2017 | Tzirkel-Hancock et al. | |
| 2018/0218230 A1 | 8/2018 | Naka et al. | |
| 2018/0238698 A1 | 8/2018 | Pedersen | |
| 2018/0329414 A1 | 11/2018 | Igarashi et al. | |
| 2018/0336007 A1 * | 11/2018 | Li | G10L 15/22 |
| 2019/0031574 A1 | 1/2019 | Liu et al. | |
| 2019/0094038 A1 * | 3/2019 | Oh | B60R 16/0373 |
| 2019/0121522 A1 | 4/2019 | Davis et al. | |
| 2019/0202478 A1 * | 7/2019 | Gruchalski | B60W 50/08 |
| 2019/0204827 A1 | 7/2019 | Bhalla et al. | |
| 2020/0041993 A1 | 2/2020 | Li | |
| 2020/0086887 A1 * | 3/2020 | Gohl | B60W 30/18163 |
| 2020/0139992 A1 | 5/2020 | Oba | |
| 2020/0141748 A1 | 5/2020 | Krysiuk | |
| 2020/0192358 A1 | 6/2020 | Yu | |
| 2021/0139036 A1 * | 5/2021 | Kim | B60R 16/0373 |

FOREIGN PATENT DOCUMENTS

| | | | | |
|---|---|---|---|---|
| CN | 107187449 A | | 9/2017 | |
| DE | 10111121 A1 * | | 9/2002 | ............ G10L 15/26 |
| DE | 102018002941 A1 | | 10/2018 | |
| EP | 1083543 B1 * | | 9/2007 | ............ G10L 15/20 |
| JP | S6446111 A | | 2/1989 | |
| JP | 2015141053 A | | 8/2015 | |
| WO | 2017151672 A2 | | 9/2017 | |

OTHER PUBLICATIONS

"An Automatic Volume Control for Preserving Intelligibility" by F. Felber, 34th IEEE Sarnoff Symposium (2011, pp. 1-5) (Year: 2011).*

Machine translation of DE 10111121 downloaded from IP.com Sep. 13, 2024 (Year: 2024).*

"Dual-Mode Vehicle Routing in Mixed Autonomous and Non-Autonomous Zone Networks" by Beirigo, Schulte, and Negenborn. 2018 21st International Conference on Intelligent Transportation Systems, Maui, Hawaii, USA, Nov. 4-7, 2018.

* cited by examiner

METHODS AND SYSTEMS FOR INCREASING AUTONOMOUS VEHICLE SAFETY AND FLEXIBILITY USING VOICE INTERACTION

CROSS REFERENCE TO RELATED APPLICATIONS

This application is a Continuation of U.S. application Ser. No. 16/734,108, filed on Jan. 3, 2020, which claims the benefit under 35 U.S.C. 119 (e) of U.S. Provisional Application No. 62/788,471, filed on Jan. 4, 2019, the contents of which are incorporated by reference herein in their entirety.

BACKGROUND OF THE DISCLOSURE

1. Field of the Disclosure

The present disclosure relates to methods and systems for autonomous vehicle safety using voice interactions.

2. Description of the Related Art

There are various levels of autonomy with which a vehicle can operate. The Society of Automotive Engineers (SAE) categorizes autonomous vehicles as Levels 0-5, where Level 0 vehicles are fully manual and Level 5 vehicles are fully autonomous. Level 0 vehicles, in which all aspects of driving are manually controlled, account for the majority of vehicles on the road today. Level 1 vehicles include a single automated aspect that assists the driver, such as an Advanced Driver-Assistance System (ADAS) for steering, speed, or the braking control system. Although Level 2 vehicles provide automated steering and acceleration capabilities, the driver remains in control of the vehicle at all times. A Level 3 vehicle is able to detect the environment and make informed decisions regarding vehicle control, such as to overtake slower moving vehicles. In a Level 3 vehicle, an occupant may be asked to assume control, if the vehicle determines that it is unable to execute a requested task, or if autonomous operation fails. A Level 4 vehicle does not require human interaction because the vehicle can intervene when there is a system failure, however the option to manually override does remain if circumstances warrant. In a Level 5 vehicle, human driving is completely eliminated, and the vehicle is capable of adaptive and situational driving. As a result, a Level 5 vehicle often does not include controls such as a steering wheel or gas or brake pedals.

Some conventional vehicles include speech systems capable of recognizing speech uttered by an occupant of the vehicle. Speech utterances may, for example, include queries or commands directed to one or more features of the vehicle, or to other systems that are accessible to the vehicle.

SUMMARY

As described herein a method and a system is provided for enabling increased safety in autonomous vehicles using voice interactions. In some embodiments, a method is provided for informing a driver of a vehicle that an autonomous driving mode is available and the vehicle's control system changes the driving mode from manual control to autonomous upon receiving a voice command from the driver. The method comprises a voice control system that generates voice dialog informing the driver that autonomous mode is possible. The vehicle's control system receives a voice command including speech utterances from a driver indicating a desire to change the driving mode from manual to autonomous. The vehicle's control system can also change the driving mode from manual to autonomous upon receipt of the command.

In some embodiments, a method is provided that enables the driver to ask if the vehicle can be operated in autonomous mode. The vehicle's control system determines if autonomous mode is possible along one or more routes to a destination, and if autonomous mode is available along at least one route, the vehicle's voice control system informs the driver of the possible route, and upon receiving a voice command from the driver, the vehicle switches to autonomous mode along the route.

In some embodiments, a vehicle includes a vehicle control system that controls the operation of the vehicle, and generates dialog informing a driver that autonomous mode is available. The vehicle further includes a microphone to receive voice commands from the driver, so that the voice commands are used to determine if a change from manual mode to autonomous mode or from autonomous mode to manual mode is desired. The vehicle's control system then changes the driving mode based on the voice command from the driver.

In some embodiments, a method is provided that determines if the driving mode must be changed from autonomous mode to manual mode. If the driving mode must be changed to manual mode, the voice control unit of the vehicle informs the driver of the need to change modes, and upon receiving a voice command from the driver acknowledging the change, the vehicle's control system will change the driving mode to manual mode.

In some embodiments, a method is provided that determines if a change in driving modes is necessary or optional. If the vehicle's control system determines that the change is necessary, it will inform the driver of the need to change driving modes and will change the driving mode upon receiving voice acknowledgment from the driver. If the vehicle control unit determines that a change in driving modes is optional, the voice control unit will inform the driver of the option, and if the driver requests to change or stay in autonomous mode, the vehicle control unit will provide the user possible routes on which the vehicle can remain in autonomous mode.

BRIEF DESCRIPTION OF DRAWINGS

Various aspects and embodiments of the disclosure are described below with reference to the following figures. It should be appreciated that the figures are not necessarily drawn to scale. Items appearing in multiple figures are indicated by like reference numerals in each figure in which the items appear. In the figures.

DETAILED DESCRIPTION

Figure 1:
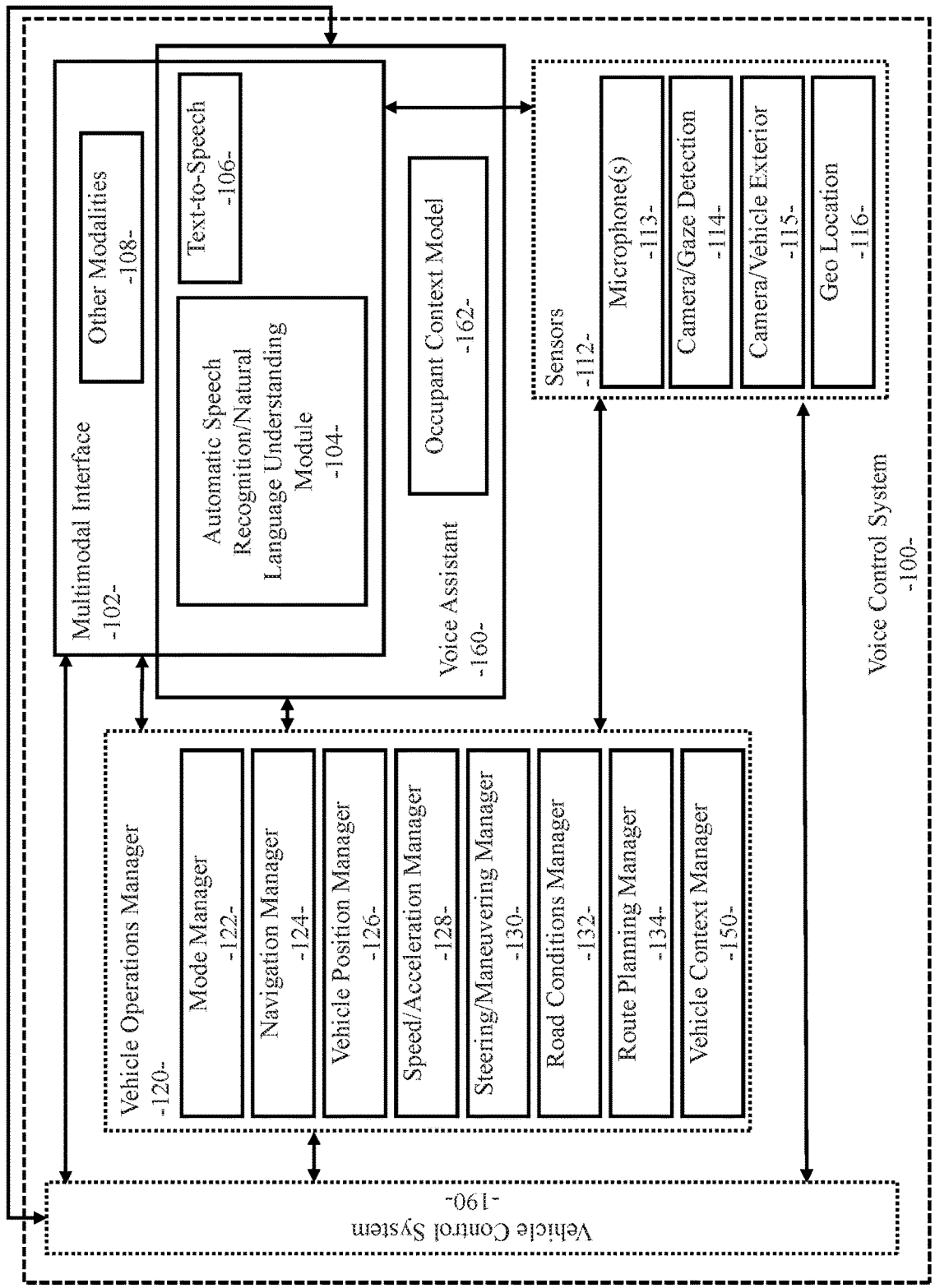
FIG. 1 is a block diagram depicting an embodiment of a voice control system.

As used herein "vehicle" can be any machine or mechanized equipment capable of transporting things from one geographical area to a different geographical area. A vehicle may be a car, bus, truck, airplane, or any similar means for transporting people, things or goods.

As used herein "autonomous vehicle" can be any vehicle that operates autonomously or semi-autonomously such that the autonomous vehicle uses sensory input to navigate and move from one geographical area to a different geographical area. Autonomous vehicles can sense their environment using various technologies such as radar, LIDAR, image sensors or other similar sensing technologies. Autonomous vehicles can navigate using global positioning systems (GPS), information provided by other vehicles, input from an occupant (e.g., a driver), or other similar input. In some instances, an autonomous vehicle can be referred to as an autonomous system.

As used herein "speech utterance" can be a unit of speech bound in part by silence. Speech utterances may, for example, include queries or commands directed to one or more vehicle features or systems, or to other systems that are accessible to the vehicle.

As used herein "voice interaction" and "voice" can relate to any speech-based communication which can include speech utterances or speech generated by a user or an autonomous system.

As used herein "occupant" can refer to any human or animal within the vehicle and can include the driver or operator of the vehicle.

An occupant of an autonomous vehicle can interact with the autonomous vehicle using speech utterances. Through voice interaction between an occupant and the autonomous vehicle, the occupant can control certain operational aspects of an autonomous vehicle. Permitting the occupant or user of an autonomous vehicle to control or interact with the autonomous vehicle through voice interaction promotes safe and flexible operation of the autonomous vehicle.

For example, voice interaction can be used to either initiate a transfer of control or warn the occupants of a transfer of control. Autonomous vehicles can transfer control of the autonomous vehicle's operation from an occupant (i.e., driver) to the autonomous vehicle's drive and control system (i.e., in Level 2-4 vehicles the autonomous vehicle can switch from being operated manually by a driver to being operating autonomously, or vice versa). A transfer of control may be driver-initiated or vehicle-initiated. When circumstances and the vehicle's capabilities are permissible (e.g., when road conditions and the environment are within the scope of the vehicle's autonomous capabilities) a transfer of control can be initiated by an occupant (i.e., driver) or the autonomous vehicle can alert the occupants of a transfer of control. In one instance, if the vehicle determines that present or future conditions are outside the scope of its capabilities, such as when a highway exit is to be taken, a traffic accident is detected ahead, when adverse weather conditions occur, a sensor malfunctions, etc., the vehicle can notify the occupants that control will be transferred from autonomous to manual. The use of voice interaction between the driver and vehicle may promote flexibility and safety around such transfers of control, through the use of different modalities than are conventionally employed, the expression of urgency when circumstances warrant, and the use of dialogue between the driver and the vehicle.

In another example, voice interaction can be used to interact with vehicles that operate entirely autonomously (e.g., Level 4-5 vehicles), such as a "robo taxi" operated by a ride-sharing service or a vehicle which is owned by the occupant but used to autonomously transport the occupant to a specified destination. Occupants can interact with these entirely autonomous vehicles through a "virtual chauffeur" that can obtain trip details such as whether to stop at a specific point along the route (e.g., to get money from an ATM), to identify the exact stopping point at the destination, to drive slow, etc. This "virtual chauffeur" permits occupants to specify through voice interaction and in real time, various details regarding a trip.

Illustrated in FIG. 1 are aspects of a system 100 for controlling autonomous operation of a vehicle. In some instances, the vehicle can operate in various modes of operation, such as an autonomous mode or a manual mode. Sensors 112 may capture information from the environment inside and outside the vehicle, from other vehicles, from vehicle infrastructure, and/or from any other suitable sources. These sensors can be a microphone 113, a camera/gaze detection sensor 114, a camera/vehicle exterior sensor 115, a geolocation sensor 116, or any other sensor capable of obtaining information about the environment within a vehicle or outside of a vehicle.

Sensors 112 provide information to autonomous vehicle operation manager 120, which controls various aspects of autonomous operation of the vehicle to fully or partially aid the occupant in operating the vehicle. The components of the autonomous vehicle operation manager 120 can include operation mode manager 122, navigation manager 124, vehicle position manager 126, speed/acceleration manager 128, steering/maneuvering manager 130, road condition manager 132, route planning manager 134, and vehicle context manager 150. The information generated by certain management modules within the autonomous vehicle operation manager 120 can be related to vehicle operation mode, navigation, vehicle position, speed and acceleration, steering and maneuvering, route planning and road conditions. This information can be used by the vehicle context manager 150 within the vehicle operation manager 120 to produce and update vehicle context data, including a current mode, a general state or condition of the vehicle, and events which have occurred or may be about to occur. For example, vehicle context data may indicate a geographic location of the vehicle, a position of the vehicle on the road and/or within a lane, a position of another vehicle relative to the vehicle, a speed or acceleration of the vehicle, a steering position or maneuver of the vehicle, a current or predicted weather condition, navigation steps of a current route, an alarm or warning signal that was generated or is about to be generated, a change in vehicle speed, a turn that has been or may be about to be made, a lane change which has been or may be about to be made, potential routes which the vehicle may take, and/or any other suitable vehicle context information. In some embodiments, vehicle context information may be captured over a period of time and can include a time stamp or sequence number associated with a state, condition, or event, such as to aid in diagnostic procedures.

In representative system 100, multimodal interface 102 receives voice input (e.g., supplied by one or more sensors 112, such as microphone 113) to ASR/NLU 104, as well as input via other modalities 108, such as via a touch screen (not shown in FIG. 1). This and other input (e.g., supplied by camera/gaze detection sensor 114 and/or other sensors 112 deployed within the vehicle), and information provided by autonomous vehicle operation manager 120, is processed by voice assistant 160 to produce and update an occupant context model 162. In some embodiments, an occupant context model may include information relating to an occupant's operation of or travel in the vehicle, such as the occupant's emotional state (e.g., as determined by his/her expressions over time), whether he/she is currently focused on vehicle operation or on other tasks, is incapacitated or otherwise incapable of operating the vehicle, is currently speaking or otherwise providing input to the vehicle, is looking at a structure, location or other point of interest outside the vehicle, and/or any other suitable occupant context information. An occupant may comprise a driver of the vehicle or a passenger.

The occupant context model 162, and information received by autonomous vehicle operation manager 120, may be used by voice assistant 160 to define voice output to the occupant (e.g., intent options, dialogue content, voice quality, intonation, speech style, etc.) via TTS 106. For example, voice assistant 160 may have access to a plurality of intent, dialogue, voice quality, intonation and/or speech style options, select certain options based on current vehicle context information, current occupant context automation, and/or associations between the two, and use the selected options to produce voice output to the occupant. The ASR/NLU 104 may then receive voice input from the occupant in response to this voice output. In some embodiments, ASR/NLU 104 may be configured to disambiguate and/or resolve driver commands comprising free speech. In this manner, voice assistant 160 may flexibly enable a voice dialogue or conversation to occur between the occupant and the vehicle. The information gathered by voice assistant 160 during interaction with the occupant may be provided to autonomous vehicle operation manager 120 for use in controlling operation of the vehicle, such as to complete an action or task specified via voice input.

Figure 2:
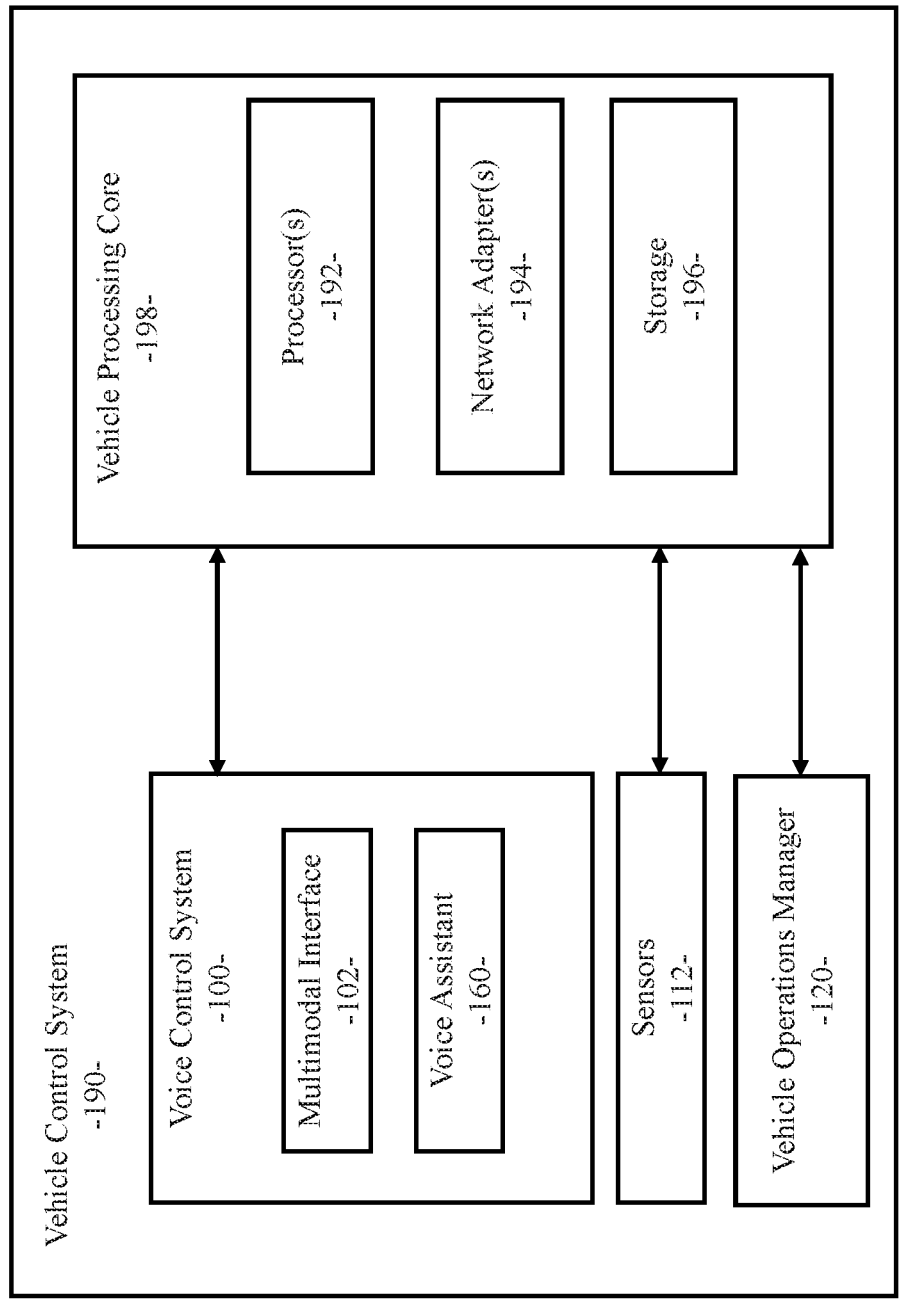
FIG. 2 is a block diagram depicting an embodiment of vehicle control system.

The elements depicted in FIG. 1 may each comprise any suitable component or collection of components configured to perform one or more of the functions described above, and/or other functions. In this respect, each element may be implemented using hardware, software or a combination thereof. Illustrated in FIG. 2 is an embodiment of a vehicle control system 190 which can include any combination of hardware and software configured to control the vehicle. This vehicle control system 190 can include a vehicle processing core 198 with one or more processors 192, one or more network adapters 194 and storage 196. The one or more processors can be used to execute instructions or software that perform aspects of the methods and systems described herein. In some instances, these executable instructions or software can be stored in storage 196. For example, the voice control system 100 can be executed and controlled by the vehicle processing core 198 using sensor 112 input and input from the vehicle operations manager 120. It should be appreciated that while FIG. 2 illustrates the sensors 112 within the vehicle control system 190, aspects of the sensors 112 can be mounted on the vehicle and outside of the vehicle control system 190. Additionally, while FIG. 1 illustrates the vehicle operations manager 120, the sensors 112 and the vehicle control system 190 as being within the voice control system 100, in some instances, aspects of these elements are outside the voice control system 100. Additionally, in some case, the vehicle control system 190 merely receives and/or transmits information/data to one or all of these elements (i.e., the vehicle control system 190, the vehicle operations manager 120 and the sensors 112. Still further, aspects of the voice assistant 160 and/or the multimodal interface 102 can be included in the vehicle control system 190. For example, software or executable instructions used to carry out aspects of the voice assistant 160 and/or the multimodal interface 102 can be stored in storage 196 and executed by one or more processors 192.

It should be appreciated that, although FIG. 1 depicts ASR/NLU 104 and TTS 106 as residing within the vehicle, embodiments of the disclosure are not limited to being implemented in this way. For example, ASR/NLU 104 and/or TTS 106 may each be located remote from the vehicle, partially on the vehicle and partially remote from the vehicle, or within the vehicle. Any suitable manner of implementation may be used, and the selection of a particular implementation may be driven by such factors as speech recognition accuracy, latency, and/or other considerations. Further, it should be appreciated that certain segments or portions of components used for supporting speech recognition functionality may reside in different locations than other segments or portions of the components. For example, in some embodiments, a segment or portion of ASR/NLU 104 which is dedicated to supporting speech recognition relating to autonomous vehicle operation may reside locally on the vehicle (e.g., to reduce latency in recognizing commands relating to autonomous vehicle operation), while other segments or portions of ASR/NLU 104 which support speech recognition functionality unrelated to autonomous operation may not reside on the vehicle, or reside partially on the vehicle (e.g., if locating these segments or portions remotely from the vehicle may improve speech recognition accuracy). Any of numerous considerations may drive which segments or portions of speech recognition components are located in particular physical locations, and the disclosure is not limited to being implemented in any particular fashion.

Using Voice Interaction to Manage Transfers of Control

Some embodiments of this disclosure are directed to using voice interaction between the driver/occupant and a vehicle, to promote flexibility and safety when transfers of control occur between manual and autonomous operation. For example, a driver can use voice commands that comprise speech utterances to request a transfer from manual operation to autonomous operation, the vehicle can use voice to announce to the driver that autonomous operation is possible or to inform the driver that a transfer to manual operation is preferable. The voice control system 100 can determine the intent of a voice command by parsing the speech utterances and using automatic speech recognition or natural language processing to determine driver intent.

The use of voice may increase flexibility, enabling a dialogue or conversation between the driver and vehicle, and allowing for functionality which conventional approaches cannot support. For example, the use of voice interaction may enable a driver to indicate that he/she intends to assume manual control at a time or upon an event in the future, rather than immediately, or may allow the driver to ask the vehicle to determine a route which allows for a maximum amount of time when the vehicle operates autonomously, or which allows autonomous operation to begin soonest. Further, a dialogue may instill confidence and trust in the driver that the vehicle understands and will act upon his/her commands, which can make vehicle operation safer overall.

Figure 3:
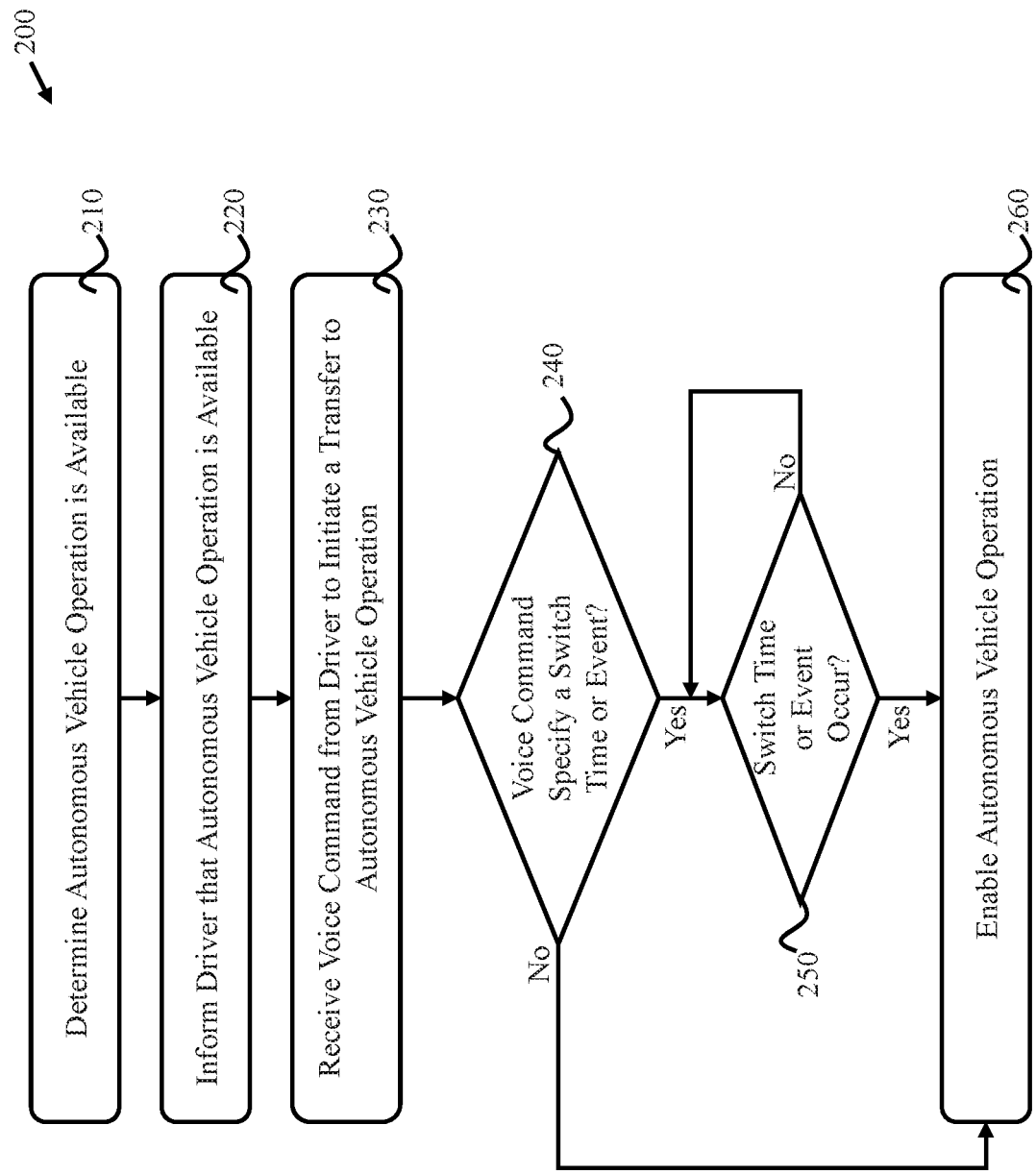
FIG. 3 is a flow chart depicting an embodiment of a process for informing a driver that autonomous operation of a vehicle is available.

FIG. 3 depicts a representative process 200 whereby an autonomous vehicle may inform a driver that autonomous operation is possible, so that the driver may then initiate a transfer of control. Process 200 may be used, for example, to inform a driver when the vehicle enters an area that allows for autonomous operation, or to otherwise proactively inform the driver that autonomous operation is possible.

At the start of representative process 200, a determination is made by the vehicle control system 190 that autonomous operation is available (step 210) such that a driver or occupant can request that the vehicle operate in an autonomous mode. The vehicle control system 190 makes this determination any number of ways. For example, the determination may be based upon constraints or criteria which vary by vehicle and/or location. In this respect, some vehicles may only be capable of operating autonomously on the highway or routes having a speed limit larger than a predetermined threshold, and some locations (e.g., cities) may specify that autonomous operation is only allowed in certain areas. As a result, the determination may be made by vehicle context manager 150 (FIG. 1) based upon information supplied by components 122-132 and sensors 112 regarding the vehicle's capabilities and/or the current location of the vehicle.

In the representative process 200 the vehicle control system 190 then proceeds to act (step 220) such that voice is used to inform the driver that autonomous vehicle operation is available. This may be performed in any of numerous ways. For example, voice assistant 160 (FIG. 1) may employ TTS 106 to produce voice output.

The vehicle control system 190 receives a voice command from a driver or occupant of the vehicle to transfer to autonomous vehicle operation (step 230). This voice command can be received by voice assistant 160 via ASR/NLU 104.

In some embodiments, voice assistant 160 may use voice biometrics to determine that a voice command to initiate transfer to autonomous operation originated from the driver and not from another occupant of the vehicle. Of course, techniques other than voice biometrics may also, or alternatively, be used to determine whether a voice command originated with a driver. For example, if a vehicle includes several microphones dispersed throughout, then the location of the microphone closest to the speaker may be used to determine whether he/she is the driver or a passenger.

The vehicle control system 190 then determines whether the received voice command specifies a time or event upon which a transfer to autonomous operation is to be initiated (step 240). A voice command may specify, for example, that autonomous operation should occur in ten seconds, at the next exit, at the Fremont exit, when the next highway is reached, and/or at upon any other suitable time or event. For example, voice assistant 160 may determine whether a voice command received via ASR/NLU 104 specifies a time or event upon which autonomous operation is to begin.

If it is determined that the voice command specifies a time or event upon which autonomous operation is to be initiated, then the vehicle control system 190 checks whether the specified time or event has occurred (step 250) and reiterates this check until the specified time or event occurs. In some instances, the event can be referred to as a trigger event. For example, if the voice command is issued by the driver at 2:20 PM to switch to autonomous mode at 2:30 PM, then the vehicle control system 190 will perform the check (step 250) until a time element (i.e., system clock, counter or otherwise) within the vehicle control system 190 equals a time value equivalent to 2:30 PM. In another example, if the driver specifies via voice command that the vehicle should operate in autonomous mode once the vehicle merges onto a particular highway, the vehicle control system 190 will perform the check (step 250) until a geo-location application within the vehicle indicates that the vehicle's position is proximate to or on the specified highway. Once the specified time or event has occurred, the vehicle control system 190 process then enables autonomous operation (step 260). For example, voice assistant 160 (FIG. 1) may instruct autonomous vehicle operation manager 120 that autonomous operation mode is to begin, and autonomous vehicle operation manager 120 may then issue corresponding instructions to the vehicle's drive system (not shown).

In the event that the received voice command (step 230) does not specify a time or event upon which autonomous mode should be enabled (step 240), the vehicle control system 190 can proceed to enable autonomous operation (step 260).

It should be appreciated that a vehicle may inform the driver that autonomous operation is available for any of numerous reasons. For example, in some embodiments of this disclosure, a driver may be informed that autonomous operation is available if it is detected that the driver is drowsy, incapacitated, distracted (e.g., by his/her phone, by kids fighting in the backseat, etc.), or otherwise unable to devote his/her full attention to driving. When this occurs, the driver may be prompted to initiate a transfer to autonomous operation. In certain circumstances (e.g., upon detecting that the driver has fallen asleep or become incapacitated), a transfer may be initiated automatically. As such, some embodiments of this disclosure may improve the safety of the driver and passengers in the vehicle.

Figure 4:
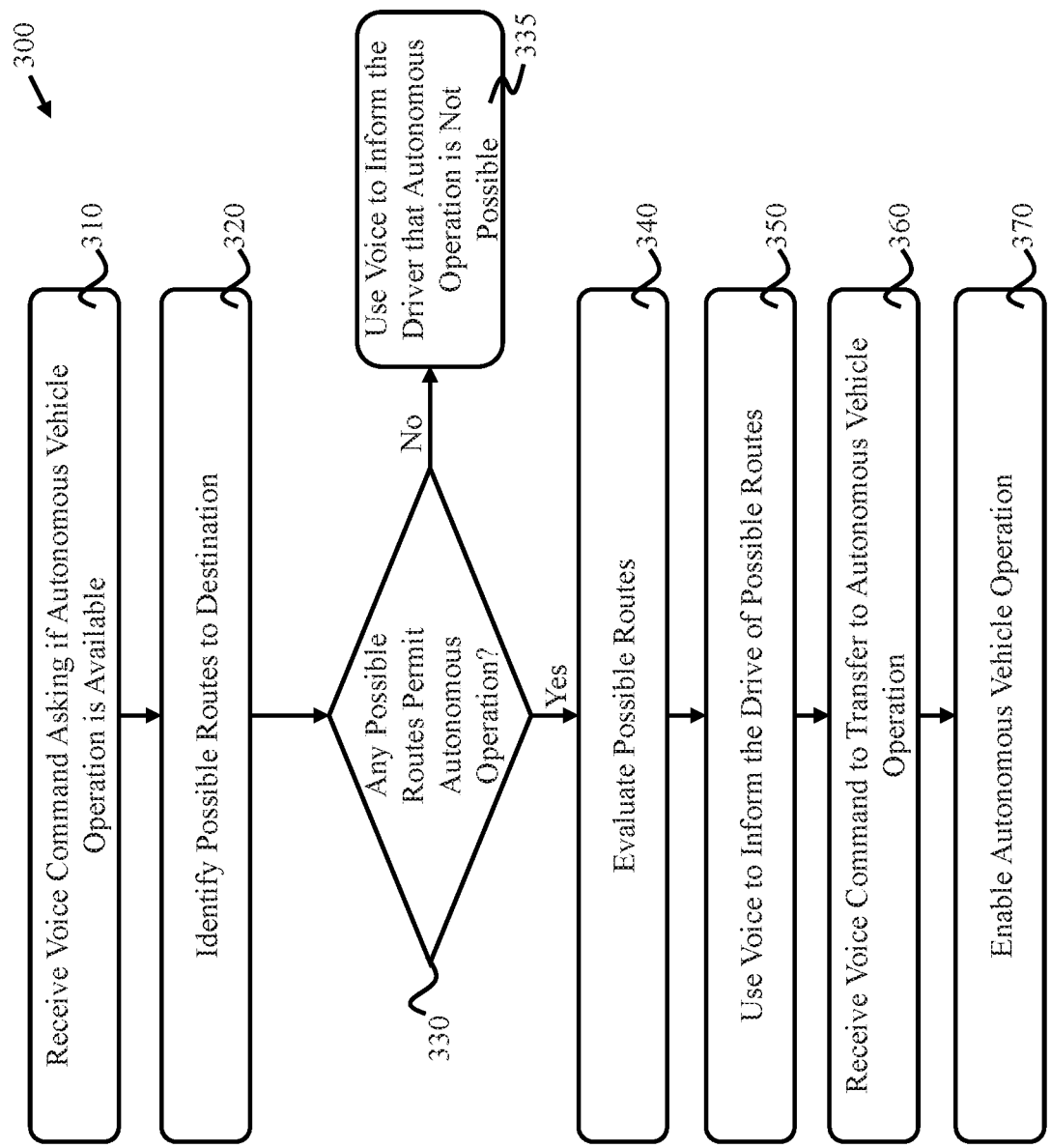
FIG. 4 is a flow chart depicting an embodiment of a process for inquiring if autonomous operation of a vehicle is available.

FIG. 4 depicts a representative process 300 whereby a driver may use voice to inquire whether autonomous operation is available while traveling to a destination. As a result, the driver need not divert attention away from the road to interact with a screen interface.

The vehicle control system 190 determines that autonomous vehicle operation, or autonomous mode, is available in response to environmental data indicating that autonomous mode is preferred or can be made in response to a voice command from the driver or a vehicle occupant questioning whether autonomous operation is available (step 310). For example, a voice command may be received by voice assistant 160 (FIG. 1) via ASR/NLU 104.

Upon receiving the voice command (step 310), the vehicle control system 190 can identify potential routes to the destination (step 320), so that one potential route which allows autonomous operation may be chosen. Potential routes to a destination may be identified in any suitable way. For example, voice assistant 160 may query route planning component 134 to identify one or more potential routes to the destination based on information provided by navigation manager 124. For example, route planning manager 134 may employ rules- and/or inferencing-based processing to identify the potential routes that exist to the destination, determine which of the potential routes allow for autonomous vehicle operation (e.g., travel in areas in which autonomous operation is allowed), evaluate potential routes according to various criteria, select a particular route based on those criteria, etc.

The vehicle control system 190 then evaluates the possible routes and determines which possible routes permit autonomous operation (step 330). In making this determination, the vehicle control system 190 can determine (step 330) that no potential routes permit autonomous operation, or that there are one or more potential routes. This determination may be made in any suitable way, such as by route planning component 134, using the techniques described immediately above. When no autonomous route is available, the vehicle control system 190 can leverage the voice control system 100 to inform the driver via voice (e.g., using TTS 106) that there is no route to the destination which allows for autonomous vehicle operation (step 335).

If at least one potential route allows for autonomous vehicle operation, then the vehicle control system 190 evaluates the possible routes (step 340) according to one or more criteria. This evaluation may, for example, be performed by route planning manager 134. Any of numerous criteria may be used to evaluate a potential route, and the criteria may be predetermined and/or determined dynamically. For example, a potential route may be evaluated based upon the amount of time that it allows the vehicle to remain in autonomous operation, how soon it allows the destination to be reached, whether gas is available along the route, and/or any of numerous other criteria.

The voice control system 100 is then leveraged to use voice to inform the driver that autonomous vehicle operation is available (step 350), and to provide information on one or more of the potential routes along which autonomous operation may be used, so that the driver may select a particular one that best suits his/her needs. In some instance, this voice can be referred to as voice-based dialog. For example, voice assistant 160 may produce voice output via TTS 106, using information provided by route planning manager 134 and/or other components of autonomous vehicle operation manager 120. The vehicle control system 190 can receive a voice command from the driver to transfer to autonomous operation along one of the potential routes (step 360) and then switch the vehicle into autonomous mode (step 370).

While the description above with reference to FIGS. 3-4 relates to transfers of control which are initiated by the driver, some embodiments of the disclosure relate to transfers of control which are initiated by the vehicle. In these instances, the use of speech as a communication medium between the driver and the vehicle allows for recognition errors (e.g., the driver's speech not being properly recognized, or detected). As such, some embodiments draw a distinction between transfers of control which must take place (i.e., the driver needs to assume manual operation of the vehicle, because autonomous operation is outside of the vehicle's capabilities) and transfers of control which are optional (i.e., the driver has the option of assuming manual operation, as manual operation may be preferable to autonomous operation for some reason).

Any of numerous circumstances may give rise to the driver needing to assume manual operation of the vehicle. For example, if a highway is about to end (e.g., if autonomous operation is only available on highway travel), weather conditions deteriorate, or an accident is detected ahead, the driver may need to assume manual operation. Similarly, there may be numerous circumstances in which a transfer to manual operation is preferable, but not necessary. For example, if staying on a previously established route to a destination means switching to manual operation, but there are other routes available, then a transfer to manual operation may be optional.

Using voice commands or a vehicle-initiated dialog with the driver to switch between autonomous or manual mode may make a vehicle-initiated transfer of control safer, whether the transfer of control is necessary or optional. In this respect, conventional approaches to transfers of control typically involve informing a driver of the need to assume manual control of the vehicle using an icon on a screen and a beep or alarm. Using voice may more fully engage the driver's other senses and may allow for urgency to be expressed around a transfer of control. For example, through the use of an "urgent" style of speech by a multi-style TTS and selective wording (e.g., "you must take control" instead of "please take control"), some embodiments of the disclosure may more effectively communicate to a driver when a transfer of control must take place. Voice interaction may be used to communicate information to the driver to facilitate a safe transfer to manual control of the vehicle. For example, voice interaction may be used to communicate the vehicle's speed, traffic density, the time until a next action is needed (e.g. to the exit), the time remaining on the drive, and/or other information which a driver may wish to know before assuming manual control of the vehicle. Providing this information may not only facilitate a safe transfer of control, but also allow the driver to change his/her mind regarding a transfer of control if certain information is different than expected.

The use of voice also enables a dialogue to occur between the driver and vehicle. This may allow for not only more flexible interaction around transfers of control (e.g., by allowing the driver to inform the vehicle that he/she needs more time before a transfer is to occur, allowing him/her to ask for more information around various options, allowing him/her to understand the vehicle's reasoning behind a request to transfer control, etc.), but can also instill confidence and trust in the driver that the vehicle understands his/her commands, and will carry them out correctly, which can further enhance vehicle safety.

As an example, voice interaction may be used to explain to the driver that, if the driver indicated via voice command that they wished to assume manual control of the vehicle but the vehicle remained in autonomous operation, the transfer did not occur because certain requirements were not met. For example, voice interaction could be used to explain to the driver that, although the vehicle detected that the driver's eyes were on the road and their hands were on the steering wheel, their foot must also be on the accelerator before manual operation can begin. By explaining the reasoning behind specific actions taken (and not taken) by the vehicle, some embodiments of the disclosure may increase the driver's confidence in the vehicle, and enable the driver to learn how to operate the vehicle more effectively over time, leading to increased vehicle safety. The use of voice interaction to explain actions which are taken or not taken by the vehicle may not be limited to actions relating to transfers of control. Voice interaction may be used to communicate the reasoning behind any of numerous types of actions.

In some embodiments, driver context information (e.g., occupant context model 162 (FIG. 1)) may dictate or influence how the driver is informed by the vehicle control system 190 of a transfer of control. For example, if an internal camera (e.g., camera/gaze detection sensor 114) detects that the driver is wearing earbuds at a point in time when a transfer of control is to be announced, the announcement may be made at a higher volume than usual, or the driver's seat may be caused to vibrate, etc., to ensure that the driver's attention is captured. This may also enhance vehicle safety.

Figure 5:
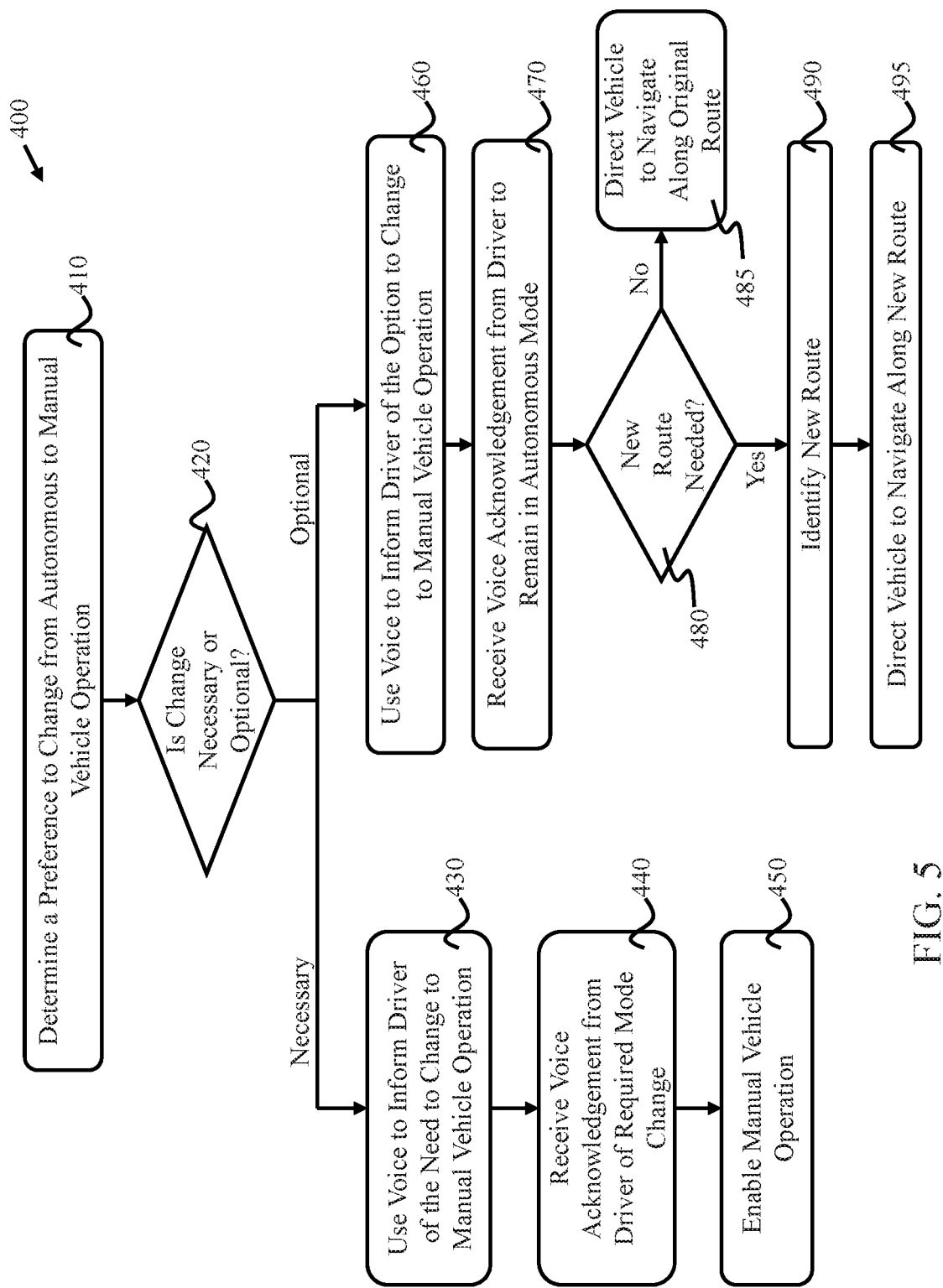
FIG. 5 is a flow chart depicting an embodiment of a process for informing a driver of an autonomous vehicle of the desirability to transfer control of operation of the vehicle.

FIG. 5 depicts a representative process 400 of using voice interaction to inform a driver of the desirability of a transfer of control. The process 400 can be carried out at least in part by the vehicle control system 190 which makes a determination that a transfer of control from autonomous vehicle operation to manual vehicle operation is preferable (step 410). This determination may be reached for any of numerous reasons, such as if is determined that a highway exit is to be taken to remain on a selected route, a traffic accident is detected ahead, adverse weather conditions are detected, a sensor that is used in autonomous operation malfunctions, and/or for any of numerous other reasons.

The vehicle control system 190 then determines whether the transfer of control is necessary, or optional (step 420). This determination may also be made in any suitable way. For example, a determination that a transfer of control is necessary may be based upon the options which are available to the vehicle. If all viable options are outside of the vehicle's capabilities, then it may be determined that a transfer of control is necessary. If it is determined that a transfer of control is necessary (step 420), then the vehicle control system 190 uses voice to inform the driver of a need to transfer to manual vehicle operation (step 430). This may be performed in any of numerous ways. For example, voice assistant 160 (FIG. 1) may employ TTS 106 to generate a voice prompt to the driver to transfer control of the vehicle. In some instances, the vehicle control system 190 receives a voice acknowledgement from the driver of the required mode change (step 440). For example, a voice acknowledgement may be received by voice assistant 160 via ASR/NLU 104. Upon receiving a driver acknowledgement (step 440), the vehicle control system 190 causes the vehicle to be operated manually (step 450) by the driver. For example, voice assistant 160 may instruct autonomous vehicle operation manager 120 to switch the vehicle to a manual operation mode.

If a determination is made that a transfer of control is optional (step 420) then the vehicle control system 190 can use voice to inform the driver that they have the option to change to manual vehicle operation (step 460). For example, voice assistant 160 may employ TTS 106 to inform the driver of the option to transfer control. The vehicle control system 190 may then receive a voice acknowledgement from the driver to remain in autonomous mode (step 470). For example, a voice command may be received by voice assistant 160 via ASR/NLU 104.

Upon receiving a voice command indicating that the vehicle should remain in an autonomous operating mode (step 470), the vehicle control system 190 then determines whether a new route is needed (step 480), and if one is not needed, the vehicle control system 190 may direct the vehicle to continue navigating along the original route (step 485). This determination may be made in any of numerous ways. For example, it may be determined that a new route is needed if remaining in autonomous operation will cause a previously scheduled highway exit to be missed.

If it is determined that a new route is needed, then the vehicle control system 190 can identify a new route (step 490), and direct the vehicle to navigate along the new route (step 495). For example, voice assistant 160 may instruct autonomous vehicle operation manager 120 to calculate a new route using information provided by navigation manager 124.

EXAMPLE 1

In one example, a vehicle operating in autonomous mode passively notifies a driver that the driver needs to take manual control of the vehicle in a set period of time, e.g., ninety seconds. The driver fails to notice the passive notification from the vehicle and continues to remain distracted (e.g., looking at their phone, reading, sleeping, watching scenery, sitting in the back seat). Upon determining that the driver remains distracted, the vehicle issues another notification to the driver that includes both audio and visual stimulation to tell the driver that they should touch a display in the vehicle to indicate that they will take over manual operation. It should be appreciated that the vehicle could require any form of affirmative input from the driver that indicates the driver is alert and acknowledged the vehicle's notification.

After a predetermined period of time, if the driver fails to touch the display, the vehicle may assess one or more environmental factors to determine whether the driver is alert or distracted. These environmental factors could include, but are not limited to, determining whether the driver's eyes are directed towards the road, identifying driver biofeedback, determining whether the driver is sleeping, or determining whether noise or commotion is preventing the driver from receiving the notification. Subsequently, the vehicle can issue one or more additional notifications or alerts to engage the driver, such as: increasing the brightness of a display, flashing lights, vibrating a seat, generating a tone, turning down the volume, or other similar alerts or notifications.

Once the driver acknowledges that they can take over manual operation, the vehicle's control system begins the process of switching from autonomous operation to manual operation. If during the switching process the driver indicates that they can no longer take over manual operation, the vehicle determines whether a new route is necessary and upon identifying another exit further down the road, updates the route accordingly to permit the vehicle to continue operating in autonomous mode until the driver is capable of taking over manual operation.

Voice-Enabled Virtual Chauffeur

Some embodiments are directed to vehicles which may operate entirely autonomously (e.g., vehicles at Levels 4-5), such as a "robo taxi" operated by a ride-sharing service, or a vehicle which is owned by the occupant but often used to autonomously transport the occupant to a specified destination. Specifically, some embodiments are directed to providing voice-enabled "virtual chauffeur" capabilities in such vehicles. As noted above, such vehicles may not have a human driver with whom an occupant can interact to specify the fine details of a trip, or any control instruments to which an occupant may provide input. As such, voice-enabled "virtual chauffeur" capabilities may allow the occupant to specify various details about a trip, and to control various navigation aspects in real time as if he/she were speaking to a driver.

Figure 6:
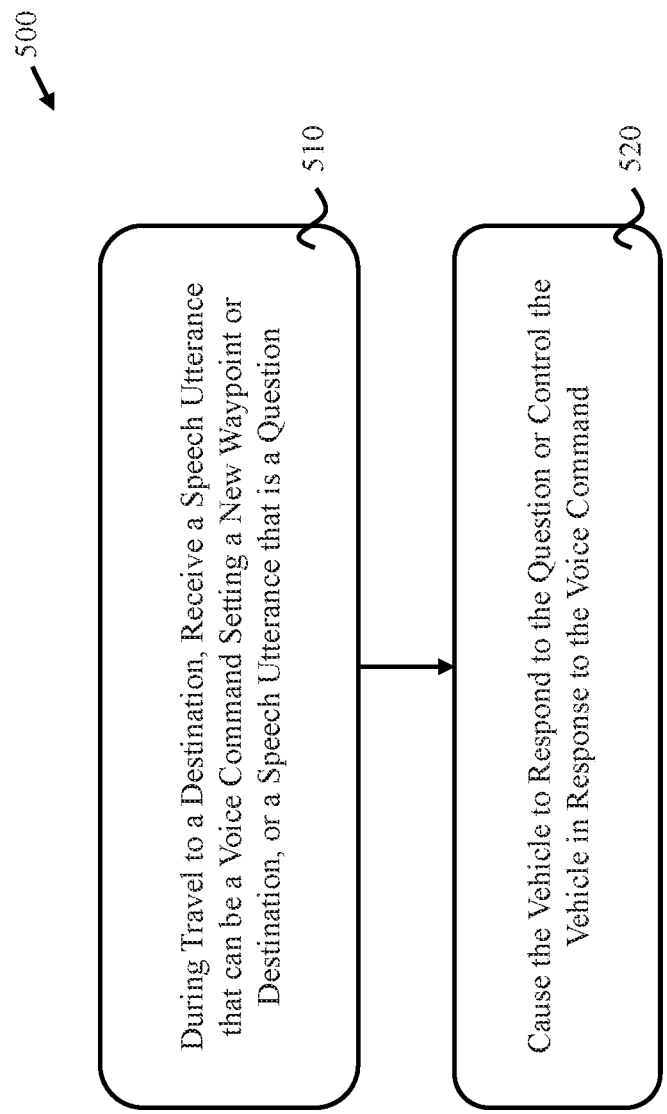
FIG. 6 is a flow chart depicting an embodiment of a process for specifying one or more details of a trip.

FIG. 6 depicts a representative process 500 performed by a voice-enabled "virtual chauffeur." At the start of process 500, a voice command is received by the vehicle control system 190, during a vehicle's travel to a destination, from an occupant of the vehicle to ask a question or to set a new waypoint and/or destination for the trip, and the vehicle then responds to the question or travels to the new waypoint or destination (step 510). A variety of the vehicle's components (e.g., shown in FIG. 1) may be used to implement this process, as described below.

For example, if the occupant asks a question about a trip, such as to inquire about the remaining distance to the destination, the estimated arrival time, whether there are any traffic jams ahead, or other trip details, then receiving the voice command or utterance (step 510) may involve voice assistant 160 receiving the question via ASR/NLU 104, processing the question using occupant context model 162 and/or information provided by vehicle context manager 150, and responding to the question via TTS 106.

Another example may involve the occupant setting a new waypoint while traveling along a route toward a destination.

For example, the occupant may indicate that the vehicle is to let him/her out at a particular spot, and then ask for the vehicle to wait until she is done, or to leave the waypoint temporarily (e.g., for a time interval specified by the occupant) and either make a trip around the block or find suitable temporary parking. The vehicle may automatically employ navigation manager 124 and route planning manager 134 of autonomous vehicle operation manager 120 (FIG. 1) to plan a trip of the desired amount of time or find a suitable parking spot nearby. For example, route planning manager 134 may identify potential trips of the desired amount of time, evaluate potential trips according to various criteria (e.g., whether the desired amount of time and circumstances near the waypoint makes parking worthwhile or preferable, whether legal parking spots are available nearby, etc.), select a particular trip to take, etc. When the vehicle returns, it may employ integrated computer vision and/or facial recognition technology (e.g., provided by camera/vehicle exterior sensor 115 (FIG. 1)) to locate the occupant on the side of the street and stop at a place where the occupant may safely board the vehicle again.

As another example, the occupant may spot a building or other point of interest outside the vehicle, and either describe it verbally (e.g., "the red building on the left-hand side"), or by looking at it (e.g., "that building"), and ask the vehicle to let him/her out there. The vehicle may employ gaze detection (e.g., using camera/gaze detection 114) and a two-or three-dimensional representation of the vehicle's vicinity (e.g., using vehicle position manager 126 of vehicle autonomous operation manager 120) to identify the point of interest identified by the occupant and translate it to an address which may then be used (e.g., by navigation manager 124) to establish a new waypoint or destination. For example, the occupant may specify that the point of interest is to be the new destination by saying "please let me out there" (e.g., received by voice assistant via ASR/NLU 104), and the vehicle may identify (e.g., using navigation manager 124) the closest safe place for letting the occupant leave the vehicle.

In certain situations, it may be inadvisable to allow an occupant to set a new way point and/or new destination for a trip. For example, if the occupant is a child, or incapacitated, then it may be inadvisable to allow the occupant to set a new waypoint or destination. As a result, some embodiments may involve voice assistant 160 employing voice biometrics to determine whether an occupant who requests a new waypoint or destination is allowed to do so. Defining the functionality that is made available to a given vehicle occupant may be accomplished in any suitable way. For example, some embodiments may provide for a "safe mode" to be used when the occupant on a trip is a child or incapacitated, and enable an authorized user to board the occupant in the car, set the destination, and only allow certain changes to be made by the occupant during the trip (e.g., to change climate controls, switch channels on the radio, etc.). Some embodiments may provide for establishing backup communication plans with an authorized user, in case an emergency or unforeseen circumstances arise. For example, some embodiments may provide for contacting an authorized user if the vehicle gets a flat tire while transporting a child to a soccer game, so that the authorized user may choose how to handle the situation. As another example, some embodiments may enable an authorized user to intervene while a trip is ongoing, such as if a vehicle becomes stuck in a traffic jam while transporting an elderly person to a doctor's appointment, enabling the authorized user to select or approve an alternate route so that the elderly person makes it to the appointment on time.

Implementation Detail

Techniques operating according to the principles described herein may be implemented in any suitable manner. Included in the description above are a series of flow charts showing the steps and acts of various processes for using voice interaction to enable an occupant of an autonomous vehicle to control certain operational aspects of the vehicle. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits, or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software that can be stored in storage 196 and included as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) or computing elements on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application. In other implementations, the functional facilities may be adapted to interact with other functional facilities in such a way as form an operating system, including the Windows® operating system, available from the Microsoft® Corporation of Redmond, Wash. In other words, in some implementations, the functional facilities may be implemented alternatively as a portion of or outside of an operating system.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media such as storage 196 to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 196 of FIG. 2 (i.e., as a portion of a vehicle processing core 198) or as a stand-alone, separate storage medium. As used herein, "computer-readable media" (also called "computer-readable storage media") refers to tangible storage media.

Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary control system 190 of FIG. 2, or one or more computing devices (or one or more processors of one or more computing devices) may be programmed to execute the computer-executable instructions. A computing device or processor may be programmed to execute instructions when the instructions are stored in a manner accessible to the computing device or processor 192, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the spirit and scope of the principles described herein. Accordingly, the foregoing description and drawings are by way of example only.

What is claimed is:

1. A method comprising using a voice-control system to cause a vehicle to transition from operating in a first mode to operating in a second mode, wherein causing said vehicle to transition comprises causing said voice-control system to execute, while said vehicle is operating in said first mode, a determining step, a generating step, a receiving step, and a responding step, wherein said determining step comprises making a determination that operation in a second mode has become available, wherein said generating step comprises, in response to having made said determination, making an announcement, wherein said announcement indicates that operation in said second mode is available, wherein said receiving step comprises receiving an utterance indicating a desire to cause said transition, wherein said responding step comprises instructing said vehicle to operate in said second mode, wherein said determining step further comprises determining that there exist first and second routes along which said operation in said second mode is available, wherein said method further comprises announcing said routes and receiving an instruction to traverse said first route in said second mode, and wherein instructing said vehicle to operate in said second mode comprises instructing said vehicle to operate in said second mode along said first route.

2. The method of claim 1, further comprising, after having instructed said vehicle to operate in said second mode, determining a need to a transition back into said first mode, announcing a need to make said transition, receiving an utterance acknowledging said transition, and instructing said vehicle to return to operating in said first mode.

3. The method of claim 1, wherein said first mode is a manual mode and said second mode is an autonomous mode.

4. The method of claim 1, further comprising, prior to said responding step, causing said voice control system to identify, in said utterance, information indicative of an event that is to occur before said transition and wherein said method comprises instructing said vehicle to operate in said second mode only upon having detected occurrence of said event.

5. The method of claim 1, wherein making said determination that operation in said second mode has become available comprises using a vehicle context manager to make said determination based at least in part on information provided by a sensor.

6. The method of claim 1, wherein making said determination that operation in said second mode has become available comprises detecting entry into an area that allows for operation in said second mode, wherein said second mode is an autonomous mode.

7. A method comprising using a voice-control system to cause a vehicle to transition from operating in a first mode to operating in a second mode, wherein causing said vehicle to transition comprises causing said voice-control system to execute, while said vehicle is operating in said first mode, a determining step, a generating step, a receiving step, and a responding step, wherein said determining step comprises making a determination that operation in a second mode has become available, wherein said generating step comprises, in response to having made said determination, making an announcement, wherein said announcement indicates that operation in said second mode is available, wherein said receiving step comprises receiving an utterance indicating a desire to cause said transition, and wherein said responding step comprises instructing said vehicle to operate in said second mode, said method further comprising, after having received said utterance indicating said desire to cause said transition, identifying a preferred route, wherein instructing said vehicle to operate in said second mode comprises instructing said vehicle to operate in said second mode along said preferred route.

8. The method of claim 7, further comprising, after having instructed said vehicle to operate in said second mode, determining a need to a transition back into said first mode, announcing a need to make said transition, receiving an utterance acknowledging said transition, and instructing said vehicle to return to operating in said first mode.

9. The method of claim 7, wherein said first mode is a manual mode and said second mode is an autonomous mode.

10. The method of claim 7, further comprising, prior to said responding step, causing said voice control system to identify, in said utterance, information indicative of an event that is to occur before said transition and wherein said method comprises instructing said vehicle to operate in said second mode only upon having detected occurrence of said event.

11. The method of claim 7, wherein making said determination that operation in said second mode has become available comprises using a vehicle context manager to make said determination based at least in part on information provided by a sensor.

12. The method of claim 7, wherein making said determination that operation in said second mode has become available comprises detecting entry into an area that allows for operation in said second mode, wherein said second mode is an autonomous mode.

13. A method comprising using a voice-control system to cause a vehicle to transition from operating in a first mode to operating in a second mode, wherein causing said vehicle to transition comprises causing said voice-control system to execute, while said vehicle is operating in said first mode, a determining step, a generating step, a receiving step, and a responding step, wherein said determining step comprises making a determination that operation in a second mode has become available, wherein said generating step comprises, in response to having made said determination, making an announcement, wherein said announcement indicates that operation in said second mode is available, wherein said receiving step comprises receiving an utterance indicating a desire to cause said transition, and wherein said responding step comprises instructing said vehicle to operate in said second mode, said method further comprising, after having received said utterance indicating said desire to cause said transition, determining that a new route is required to operate in said second mode and wherein instructing said vehicle to operate in said second mode comprises instructing said vehicle to operate in said second mode along said new route.

14. The method of claim 13, further comprising, after having instructed said vehicle to operate in said second mode, determining a need to a transition back into said first mode, announcing a need to make said transition, receiving an utterance acknowledging said transition, and instructing said vehicle to return to operating in said first mode.

15. The method of claim 13, wherein said first mode is a manual mode and said second mode is an autonomous mode.

16. The method of claim 13, further comprising, prior to said responding step, causing said voice control system to identify, in said utterance, information indicative of an event that is to occur before said transition and wherein said method comprises instructing said vehicle to operate in said second mode only upon having detected occurrence of said event.

17. The method of claim 13, wherein making said determination that operation in said second mode has become available comprises using a vehicle context manager to make said determination based at least in part on information provided by a sensor.

18. The method of claim 13, wherein making said determination that operation in said second mode has become available comprises detecting entry into an area that allows for operation in said second mode, wherein said second mode is an autonomous mode.

19. A method comprising using a voice-control system to cause a vehicle to transition from operating in a first mode to operating in a second mode, wherein causing said vehicle to transition comprises causing said voice-control system to execute, while said vehicle is operating in said first mode, a determining step, a generating step, a receiving step, and a responding step, wherein said determining step comprises making a determination that operation in a second mode has become available, wherein said generating step comprises, in response to having made said determination, making an announcement, wherein said announcement indicates that operation in said second mode is available, wherein said receiving step comprises receiving an utterance indicating a desire to cause said transition, wherein said responding step comprises instructing said vehicle to operate in said second mode, and wherein making said determination that operation in said second mode has become available comprises determining that said vehicle has entered a portion of a route having a speed limit that is larger than a predetermined threshold speed limit.

20. The method of claim 19, further comprising, after having instructed said vehicle to operate in said second mode, determining a need to a transition back into said first mode, announcing a need to make said transition, receiving an utterance acknowledging said transition, and instructing said vehicle to return to operating in said first mode.

21. The method of claim 19, wherein said first mode is a manual mode and said second mode is an autonomous mode.

* * * * *